United States Patent [19]

Eddy

[11] Patent Number: 4,824,235

[45] Date of Patent: Apr. 25, 1989

[54] OPTICAL OCCLUDER

[76] Inventor: Michael Eddy, 510 1/2 Sierra Pl., El Segundo, Calif. 90245

[21] Appl. No.: 126,833

[22] Filed: Nov. 30, 1987

[51] Int. Cl.$^4$ .......................... A61B 3/10; G02B 23/16
[52] U.S. Cl. .................................... 351/200; 351/205; 350/578
[58] Field of Search ....................... 351/200, 205, 158; 350/578

[56] References Cited

U.S. PATENT DOCUMENTS 1,463,938  8/1923  Carter .
1,845,796  2/1932  Kaulke .

FOREIGN PATENT DOCUMENTS 1463525  11/1966  France ................................ 350/578

Primary Examiner—Rodney B. Bovernick
Attorney, Agent, or Firm—Pretty, Schroeder, Brueggemann & Clark

[57] ABSTRACT

An optical occluder adapted for use with monocular optical instruments having a variety of shapes and sizes, for blocking the vision the user's eye that is not looking through the instrument. The occluder includes a central retainer body to which are attached both a generally planar eye shield and a elastic cord of adjustable length. The cord can be selectively wrapped around an optical's instrument's eyepiece, to hold the occluder in a stable position relative to it, and the eye shield can be selectively positioned both radially and circumferentially relative to the central retainer, to suit the user's particular eye spacing and comfort.

1 Claim, 2 Drawing Sheets

OPTICAL OCCLUDER

BACKGROUND OF THE INVENTION

This invention relates generally to optical occluders suitable for use with monocular optical instrument, for blocking the vision of the user's eye that is not looking through the instrument. More particularly, this invention relates to optical occluders adapted for attachment to monocular optical instruments having a variety of shapes and sizes. Users of monocular optical instruments, including microscopes, telescopes, cameras and the like, have long recognized that closing the eye not looking through the instrument is bothersome and, over extended time periods, can be quite fatiguing. Keeping both eyes open will eliminate that fatigue, but ordinarily will cause two different images to be perceived by the brain, one image being that provided by the optical instrument and the other being of objects surrounding the instrument. Separating these two conflicting images in the brain can cause confusion, fatigue and headaches.

In the past, some monocular optical instruments have included special optical occluders for blocking the vision of the user's eye not looking into the instrument. These occluder's have typically included a generally planar, disc-shaped eye shield and an associated cylindrical collar for attachment directly to the optical instrument's eyepiece. Although generally effective in blocking the vision of the user's second eye, and thus reducing eye fatigue, the occluders have not proven to be entirely satisfactory in use.

One drawback to the optical occluders described above is that the eye shield is not fully adjustable relative to the optical axis of the optical instrument. It thus is not sized to be completely effective for users having a range of spacings between their two eyes. Another drawback is that the cylindrical collar of each occluder is adapted for use with optical instruments having just a single size and shape. Thus, each optical instrument must ordinarily be provided with a its own occluder.

It should be appreciate from the foregoing description that there is a need for an optical occluder that is adapted for attachment to monocular instruments having a variety of shapes and sizes and that can be adjusted to accommodate the specific eye spacings of a variety of users. The present invention fulfills this need.

SUMMARY OF THE INVENTION

The present invention is embodied in an optical occluder apparatus adapted for use with monocular optical instruments having a variety of shapes and sizes and adapted to accommodate users having a variety of eye spacings. The apparatus includes an eye shield of sufficient size to substantially block the vision of a user's eye and a cord adapted to be wrapped around the eyepiece of the optical instrument, regardless of the eyepiece's shape and size. Retaining means connects together the eye shield and cord and holds the eye shield in a selected position relative to the eyepiece such that when the user views through the eyepiece with one eye, the eye shield substantially blocks the vision of the other eye. The occluder apparatus is inexpensive to manufacture, yet convenient to use and completely effective in attaching to optical instruments having a wide range of sizes and shapes.

In more detailed aspects of the invention, the retaining means includes a rigid body with a constricting hole for receiving the cord and defining a loop of adjustable length that can be wrapped around the optical instrument's eyepiece. The cord is preferably elastic and can include a textured outer surface such that is frictionally gripped by the constricting hole, to fix the loop at a selected length. The remaining means can further include a recessed abutment surface, to provide a stable engagement with the eyepiece. The retaining means allows radial and circumferential adjustment of the eye shield relative to the cord and eyepiece by including a slot and pin combination. The slot can be formed in an elongated tab projecting radially outwardly from the eye shield, and the pin can be secured to the retaining means body.

Other features and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
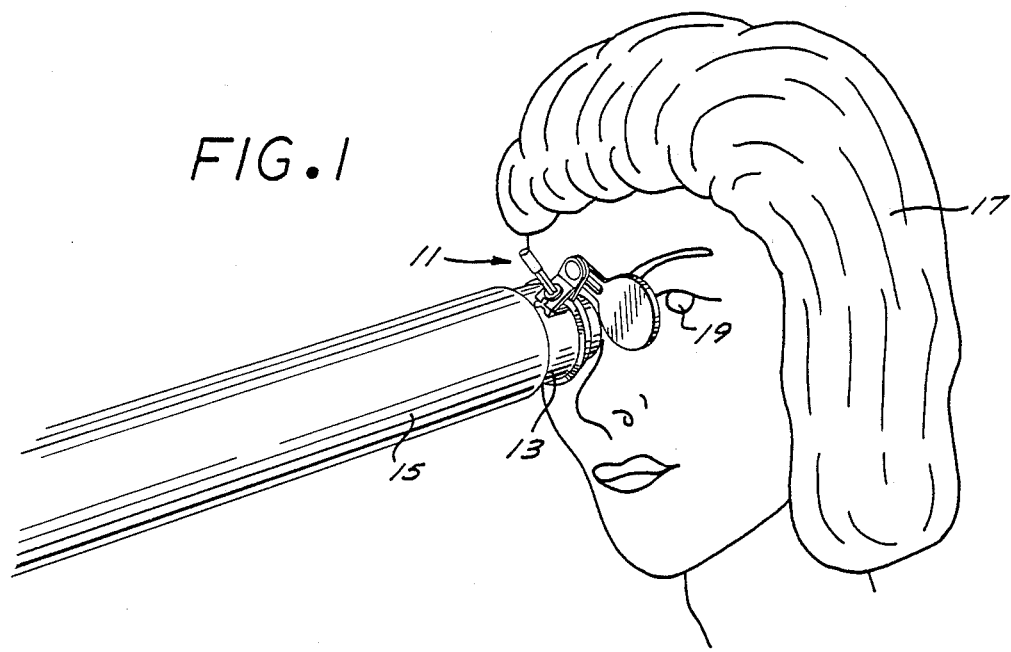
FIG. 1 is a perspective view of an optical occluder embodying the present invention, shown in use attached to the eyepiece of an optical an monocular instrument and blocking the vision of the left eye of a user looking through the instrument with her right eye.
Figure 2:
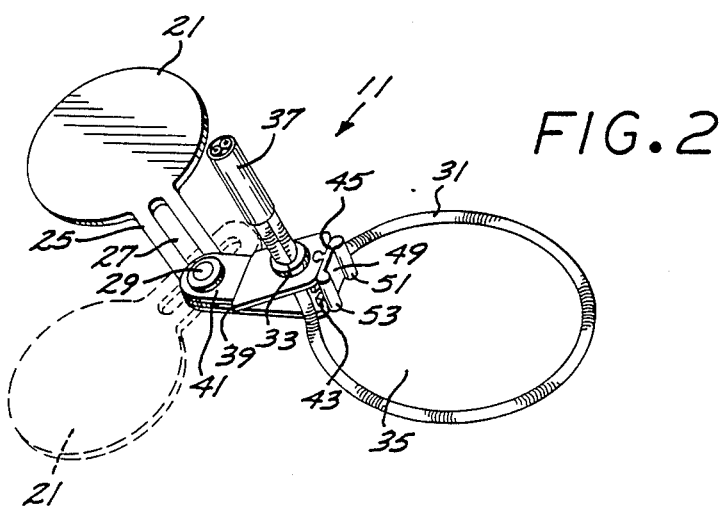
FIG. 2 is a perspective view of the optical occluder of FIG. 1, with one selected position of the eye shield being depicted in solid lines and an alternative position being depicted in phantom lines.
Figure 5:
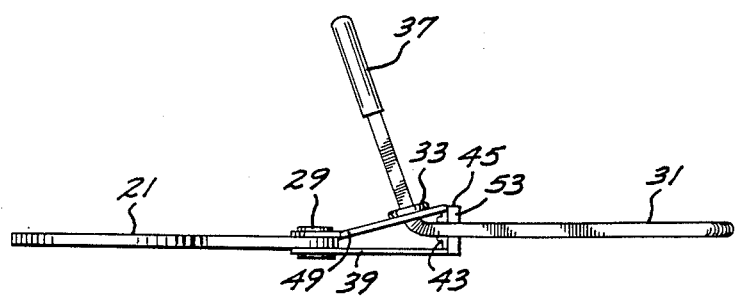
FIG. 5 is a side view of the optical occluder.

With reference now to the drawings, and particularly to FIGS. 1, 2 and 5, there is shown an optical occluder 11 attached to the eyepiece 13 of a monocular optical instrument 15. The occluder blocks the vision of the eye 17 of a user 19 who is looking into the instrument using her other eye (not shown), such that she can keep both eyes open, yet perceive only a single image. This significantly reduces eye strain and fatigue.

The optical occluder 11 includes a generally planar, disc-shaped eye shield 21 sized to substantially block the vision of the user's eye 17 when positioned in front of it. Tee shield is connected to a retainer body 23 in a manner that permits its selective positioning relative to that retainer body. In particular, an integral tab 25 projects radially outwardly from the shield and includes an elongated slot 27 sized to receive a pin 29 carried on the retainer body. The shield may be moved such that the pin slides along the slot, to adjust the distance between the center of the shield and the retainer body. In addition, the shield may be pivoted about the pin, to adjust the shield's circumferential position relative to the retainer body. Two alternative positions for the eye shield 1 relative to the retainer body are depicted in FIG. 2.

In accordance with the invention, an elastic cord 31 extends through a constricting hole 33 formed in the retainer body 23, to define a loop 35 of adjustable length that can be selectively positioned around the eyepiece 13 of the optical instrument 15. The length of the loop can be adjusted by pulling the cord one way or the other through the constricting hole. This facilitates attachment of the cord, and thus the entire occluder, to eyepieces having a variety of sizes. A plastic band 37 may be wrapped around the two free ends of the cord, to prevent them from being inadvertently pulled out through the constricting hole. Although the eyepiece depicted in FIG. 1 is generally cylindrical, it will be appreciated that the cord could alternatively be wrapped around other eyepiece shapes such as square or rectangular shapes.

Figure 3:
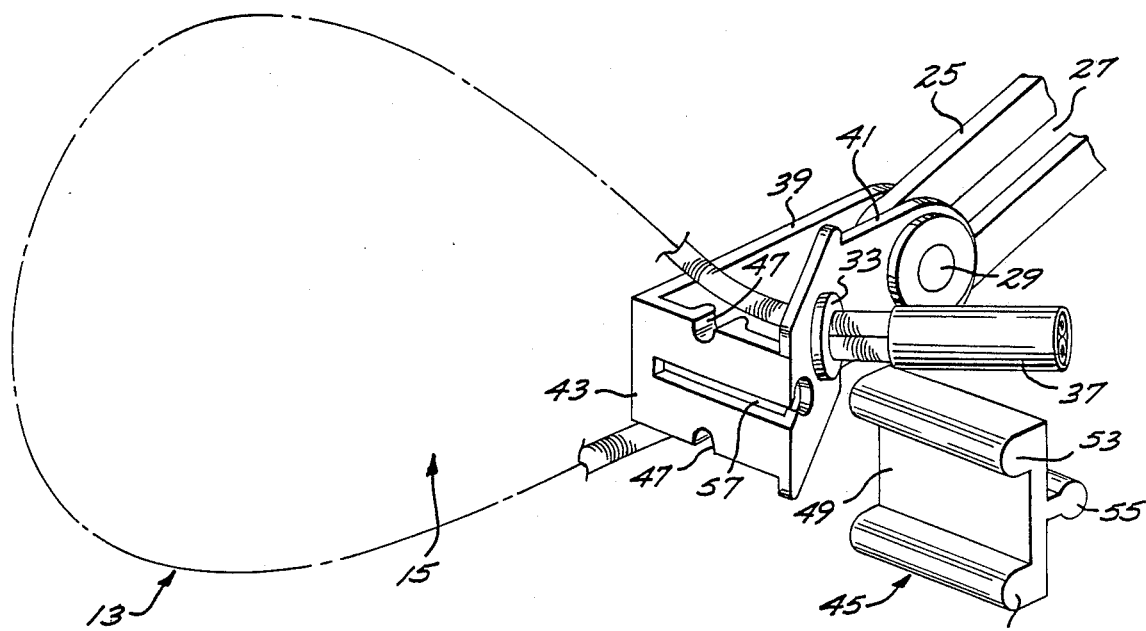
FIG. 3 is an enlarged, exploded view of the retainer portion of the optical occluder.

As best depicted in FIGS. 2, 3 and 5, the retainer body 23 is formed from an elongated, plastic sheet that is folded back on itself, such that its two ends, 39 and 41 straddle the slotted tab 25 of the eye shield 21. The pin 29 holds the two ends together and confines the tab between them. The pin may conveniently take the form of a metal or plastic rivet.

The folded retainer body 23 includes three principal segments 39 and 41 and a middle segment 43. As depicted best in FIG. 3, the portions of the two end segments opposite the pin 29 diverge from each other and terminate at the middle segment, which is oriented substantially perpendicular to the plane of the eye shield 21. The constricting hole 33 through which the elastic cord 31 passes is located in the end segment 41. The middle segment carries a fitting 45 that is specially configured to abut securely against the eyepiece 13 of the optical instrument 15.

In use, the cord loop 35 is stretched around the eyepiece 13 of the optical instrument 15, after first adjusting the length of the loop by pulling the cord one way or the other through the constricting hole 33. With the length of the loop adjusted such that it is stretched just slightly when extended around the eyepiece, the fitting 45 attached to the middle segment 43 of the retainer body 23 will press against the eyepiece and secure the occluder in place. In particular, the occluder will be positioned with the eye shield 21 oriented in a plane substantially perpendicular to the instrument's optical axis. The radial and circumferential positions of the eye shield relative to the optical instrument can then be selectively adjusted (by sliding and pivoting the slotted tab 25 relative to the pin 29) so that the eye shield is properly positioned to block the vision of the user's eye 19, as depicted in FIG. 1.

To facilitate a proper positioning of the retainer body 23 relative to the optical instrument eyepiece 13, the middle segment 43 of the retainer body includes notches 47 on its opposite sides, for receiving and holding portions of the cord loop 35. This biases the loop into a plane substantially facilitates alignment of the eye shield 21 in its 15.

Figure 4:
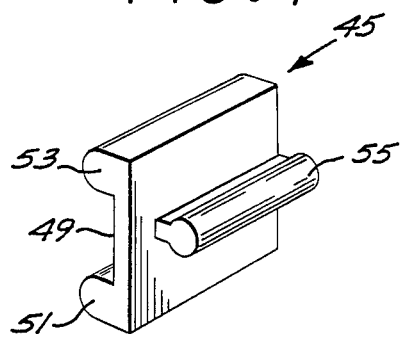
FIG. 4 is an enlarged, rear perspective view of a fitting that can be used as part of the retainer that abuts against the optical instrument and holds the occluder securely in place.

As best depicted in FIGS. 3 and 4, the fitting 45 that is secured to the middle segment 43 of the retainer body 23 includes a shallow recess in its outwardly-facing side, to facilitate its stable abutment with the eyepiece 13 of the optical instrument 15. In particular, this recess is defined by a generally flat wall 49 bounded on its opposite sides by two half cylindrical projections 51 and 53. The projections are oriented with their axes substantially perpendicular to the plane of the cord loop 35, so as to facilitate a stable abutment with eyepieces of most typical shapes and sizes. The opposite, inwardly-facing side of the fitting includes an elongated tongue 55 that can be slid into a mating groove 57 formed in the middle segment of the retainer body, to securely hold the fitting in its prescribed position.

The eye shield 21 and retainer body 23 both can be cut from a thin sheet of opaque, plastic material having sufficient rigidity to retain its shape in normal use. Alternatively, they may be injection molded. The retainer body is preferably initially scored, to facilitate its being bent into the desired three-segment shape.

The fitting 45 that is removably secured to the retainer body 23 is preferably formed of an injection-molded plastic material. The cord 31 is preferably formed of a rubber material, with a braided fabric material forming its exterior surface. Sufficient friction is thereby developed between the selected position. The friction also serves to provide a reliable grip on the optical instrument eyepiece 13.

It should be appreciated from the foregoing description that the present invention provides an improved optical occluder that may be used with monocular optical instruments having a variety of shapes and sizes. The occluder includes a substantially planar eye shield and a special retainer that supports the eye shield in a way that permits it to be adjusted both radially and circumferentially relative to the instrument. An elastic cord of adjustable length projects outwardly from the retainer, for attaching the occluder to optical instrument eyepieces having a variety of shapes and sizes.

Although the invention has been described in detail with reference to the presently preferred embodiment, those of ordinary skill in the art will appreciate that various modifications can be made without departing from the invention. Accordingly, the invention is defined only by the following claims.

I claim:

1. Optical occluder apparatus for use with an optical instrument having a monocular eyepiece with an optical axis defined through it, adapted for viewing by a person using just one eye, the apparatus comprising:
   an eye shield of sufficient size to substantially block the vision of a person's eye;
   a cord adapted to be snugly wrapped around the eyepiece of the optical instrument, regardless of the eyepiece's shape; and
   retaining means for connecting together said eye shield and said cord and for holding said eye shield in a selected position relative to the eyepiece of the optical instrument, such that when the person views through the eyepiece with one eye, said eye shield substantially blocks the vision of the person's other eye, wherein said retaining means includes means defining a constricting hole for receiving the two ends of said cord, thereby forming a loop having a length that is adjustable by pulling said cord through said hole.

2. Optical occluder apparatus as claimed in claim 1, wherein said retaining means includes adjusting means for allowing said eye shield to be selectively moved both radially and circumferentially relative to the optical axis of the optical instrument.

3. Optical occluder apparatus as claimed in claim 2, wherein said adjusting means includes:
   a tab having an elongated slot formed therein; and
   a pin located within said slot and slidable to a selected position within said slot, to allow said eye shield to be positioned in a selected radial and circumferential position relative to the optical axis of the optical instrument.

4. Optical occluder apparatus as claimed in claim 3, wherein:
   said eye shield is substantially planar; and said tab is integral with said eye shield and protrudes radially therefrom.

5. Optical occluder apparatus as claimed in claim 1, wherein said cord is stretchable and has a textured outer surface to provide sufficient friction with said hole to secure the cord in place.

6. Optical occluder apparatus as claimed in claim 5, wherein:

said eye shield is substantially planar; and said retaining means includes a surface for abutting against the eyepiece of the optical instrument, such that said eye shield is held with its plane substantially perpendicular to the optical axis of the eyepiece.

7. Optical occluder apparatus as claimed in claim 5, wherein:

said cord is formed of an elastic material; and said retaining means and said eye shield are formed of a plastic material.

8. Optical occluder apparatus as claimed in claim 1, wherein said retaining means includes a recessed surface configured for stable engagement with the eyepiece.

9. Optical occluder apparatus as claimed in claim 1, wherein said retaining means includes a notch sized to receive said cord and to hold said retaining means in a predetermined fixed position relative to the optical axis of the eyepiece.

10. In combination with a monocular optical instrument having an optical axis defined therethrough, an optical occluder for enabling a person to use the instrument with both eyes opened, comprising:

a generally planar eye shield;

retaining means secured to said eye shield, but allowing said eye shield to be selectively positioned relative thereto; and a cord connected to said retaining means and including a loop adapted to be wrapped around the monocular optical instrument, to secure said retaining means in a selected position relative to the instrument;

wherein the retaining means includes means defining an elongated slot and a pin extending through the slot, wherein the pin is slidable along the slot to permit a selective radial positioning of the eye shield relative to the optical axis of the optical instrument and wherein the eye shield is pivotable about the axis of the pin to permit a selective circumferential positioning of the eye shield relative to the optical axis of the optical instrument, and wherein said retaining means further includes means defining a whole through which said cord passes to adjust the length of the loop wrapped around the optical instrument.

11. A combination as claimed in claim 10, wherein said cord has a textured outer surface providing sufficient friction with said hole to secure the cord in place.

12. A combination as claimed in claim 10, wherein:

said cord is stretchable, to wrap around optical instruments having various sizes and shapes; and said retaining means includes a recessed surface for stable engagement with the optical instrument when said cord is wrapped around the instrument.

13. A combination as claimed in claim 10, wherein said retaining means includes a notch sized to receive said cord and thereby to hold said retaining means in a predetermined position relative to the optical axis of the optical instrument.

14. A combination as claimed in claim 10, wherein said eye shield and said retaining means are formed of a plastic material.

* * * * *

UNITED STATES PATENT AND TRADEMARK OFFICE
CERTIFICATE OF CORRECTION

PATENT NO. : 4,824,235

DATED : April 25, 1989

INVENTOR(S) : Michael Eddy

It is certified that error appears in the above-identified patent and that said Letters Patent is hereby corrected as shown below:

In column 2, line 52, change "Tee" to --The--.

In column 2, line 63, delete "1".

In column 3, line 52, after "substantially" insert --perpendicular to the middle segment, and thus--.

In column 3, line 53, after "its" insert --desired orientation relative to the optical instrument--.

In column 4, line 12, after "between the" insert --cord and the constricting hole 33 to hold the cord in--.

In column 6, line 16, change "whole" to --hole--.

Signed and Sealed this

Twenty-seventh Day of March, 1990

Attest:

JEFFREY M. SAMUELS

*Attesting Officer*   *Acting Commissioner of Patents and Trademarks*